United States Patent
Lai et al.

(10) Patent No.: US 10,884,193 B2
(45) Date of Patent: Jan. 5, 2021

(54) DUAL GRATING SENSING SYSTEM, DUAL GRATING SENSOR AND DETECTING METHOD THEREOF

(71) Applicant: NATIONAL CHUNG CHENG UNIVERSITY, Chiayi (TW)

(72) Inventors: Yu-Hsing Lai, Chiayi (TW);
Hsun-Yuan Li, Chiayi (TW);
Wen-Hsin Hsieh, Chiayi (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 0 days.

(21) Appl. No.: 16/737,516

(22) Filed: Jan. 8, 2020

(65) Prior Publication Data

US 2020/0225419 A1 Jul. 16, 2020

(30) Foreign Application Priority Data

Jan. 11, 2019 (TW) .............................. 108101256 A

(51) Int. Cl.
*G02B 6/34* (2006.01)
*G02B 6/35* (2006.01)
*G01N 21/77* (2006.01)

(52) U.S. Cl.
CPC .............. *G02B 6/34* (2013.01); *G02B 6/3534* (2013.01); *G01N 21/7743* (2013.01)

(58) Field of Classification Search
CPC .... G02B 6/34; G02B 6/3534; G01N 21/7743; G01N 2021/7776
See application file for complete search history.

(56) References Cited

U.S. PATENT DOCUMENTS 5,015,835 A * 5/1991 Ohuchida ............ G11B 7/0912
250/201.5
6,643,246 B2 * 11/2003 Furuhata .............. G11B 7/0906
369/112.05

(Continued)

FOREIGN PATENT DOCUMENTS

CN 104730007 A * 6/2015
TW 201416061 A 5/2014

(Continued)

OTHER PUBLICATIONS

Cottier, K. et al. "Label-free highly sensitive detection of (small) molecules by wavelength interrogation of integrated optical chips" Sensors and Actuators B 91 (2003) pp. 241-251.

(Continued)

*Primary Examiner* — Andrew Jordan
(74) *Attorney, Agent, or Firm* — Volpe Koenig

(57) ABSTRACT

The present invention provides a dual grating sensor having at least two double-sided grating structures for detecting the properties of an analyte. The dual grating sensor includes a substrate, a waveguide layer which is formed on the substrate and has at least two double-sided grating structures, and an upper cover configured on the waveguide layer, wherein a channel is formed between the upper cover and the waveguide layer for the analyte to flow therethrough. A light couples into the waveguide layer via the first double-sided grating structure, transmits in the waveguide layer, and couples out of the waveguide layer via the second double-sided grating structure, such that the properties of the analyte can be detected according to the change of the light intensities of the emergent light. The sensitivity of the dual grating sensor has an additive effect when the light passes through the first double-sided grating structure and the second double-sided grating structure.

17 Claims, 15 Drawing Sheets

(56) References Cited

U.S. PATENT DOCUMENTS

| | | | | |
|---|---|---|---|---|
| 6,903,815 B2* | 6/2005 | Uchiyama | A61B 5/14525 | |
| | | | | 356/300 |
| 7,054,514 B2* | 5/2006 | Uchiyama | A61B 5/14525 | |
| | | | | 356/300 |
| 7,212,693 B2* | 5/2007 | Carr | G01N 21/45 | |
| | | | | 385/12 |
| 7,269,308 B2* | 9/2007 | Tono | G01N 21/7703 | |
| | | | | 385/12 |
| 7,567,734 B2* | 7/2009 | Dai | G01N 21/4133 | |
| | | | | 385/10 |
| 8,218,151 B2* | 7/2012 | Peled | G01N 21/7703 | |
| | | | | 356/477 |
| 9,140,857 B2* | 9/2015 | Hsieh | G02B 6/34 | |
| 9,316,592 B2* | 4/2016 | Peled | G01N 21/7703 | |
| 9,678,012 B2* | 6/2017 | Rothberg | G01N 21/6428 | |
| 9,784,679 B2* | 10/2017 | Rothberg | C12Q 1/6874 | |
| 9,885,657 B2* | 2/2018 | Rothberg | C12Q 1/6869 | |
| 10,048,208 B2* | 8/2018 | Rothberg | G01N 21/6486 | |
| 10,288,565 B2* | 5/2019 | Rothberg | G01N 21/648 | |
| 10,288,566 B2* | 5/2019 | Rothberg | C12Q 1/6869 | |
| 10,502,684 B2* | 12/2019 | Rothberg | G01N 21/6428 | |
| 2002/0131348 A1* | 9/2002 | Furuhata | G11B 7/133 | |
| | | | | 369/44.37 |
| 2005/0135723 A1* | 6/2005 | Carr | G01N 33/569 | |
| | | | | 385/12 |
| 2009/0041405 A1* | 2/2009 | Dai | G01N 21/4133 | |
| | | | | 385/12 |
| 2010/0231920 A1* | 9/2010 | Peled | G01N 21/7703 | |
| | | | | 356/477 |
| 2012/0244633 A1* | 9/2012 | Peled | G01N 21/7703 | |
| | | | | 436/501 |
| 2014/0112613 A1* | 4/2014 | Hsieh | G02B 6/34 | |
| | | | | 385/12 |
| 2020/0225419 A1* | 7/2020 | Lai | G02B 6/34 | |

FOREIGN PATENT DOCUMENTS

| | | | | |
|---|---|---|---|---|
| TW | 201508249 A | | 3/2015 | |
| WO | WO-2014198409 A1 | * | 12/2014 | G01N 21/552 |

OTHER PUBLICATIONS

Darwish, N. et al. "Multi-analytic grating coupler biosensor for differential binding analysis" Sensors and Actuators B 144 (2010) pp. 413-417.

Office Action issued in corresponding Taiwanese Patent Application No. 108101256 dated Aug. 7, 2019, consisting of 6 pp.

* cited by examiner

DUAL GRATING SENSING SYSTEM, DUAL GRATING SENSOR AND DETECTING METHOD THEREOF

CROSS-REFERENCE TO RELATED APPLICATION AND CLAIM OF PRIORITY

The application claims the benefit of Taiwan Patent Application No. 108101256, filed on Jan. 11, 2019, at the Taiwan Intellectual Property Office, the disclosures of which are incorporated herein in their entirety by reference.

FIELD OF THE INVENTION

The present invention is related to a dual grating sensor. Particularly, the present invention is related to a sensor having two double-sided grating structures.

BACKGROUND OF THE INVENTION

In recent years, more and more attention has been focused on the accuracy and convenience of optical biosensors in the biomedical detection field. Because the optical waveguide biosensing technique has become more accurate and convenient, it is usually applied to the biomedical detection apparatus in various industries.

In general, an optical biosensor can couple light into it and out of it by its grating structure, followed by detecting the properties of the emergent light influenced by an analyte in the optical biosensor, and then determining the properties of the analyte.

In addition to the parameters, e.g. the structure and size of the grating and the wavelength of the incident light, the refractive index unit (RIU) corresponding to the concentration of the analyte is specifically related to the incident angle of the incident light, and the light intensity and the emergent angle of the emergent light. Therefore, after the incident angle of the incident light and the light intensity and the emergent angle of the emergent light are detected by an optical biosensor, the refractive index (RI) can be determined according to the specific relationship to obtain the concentration of the analyte.

The conventional biosensing method includes detection methods for the labeled analytes and the label-free analytes. The process for detecting the labeled analytes must a specific second antibody to label on this analyte, and then the labeled analyte is guided into the chamber of the optical biosensor, or conjugate a specific component (e.g. HRP-conjugate) on this analyte in the chamber, and determine the specific component of this analyte based on signals (e.g. fluorescence) generated in the reaction. However, the process for detecting the label-free analyte only needs to guide the analyte into the chamber without pre-coating the specific labeled component or the specific labeled antibody in the chamber of the optical biosensor so that this characteristic is able to save the time for conjugation and decrease the number of detection steps required for the labeled analyte and the experimental errors caused by labeling.

The conventional optical waveguide biosensor uses the prism or the single-sided grating as the coupling element to couple the light into the waveguide layer, and then determines the emergent angle and the wavelength variation of the emergent light which passes through the waveguide layer so as to achieve the detection purpose.

Furthermore, the conventional dual grating sensor, such as described by Cottier et al. (Cottier et al. Label-free highly sensitive detection of (small) molecules by wavelength interrogation of integrated optical chips. Sensors and Actuators B: Chemical. 2003. 91(1): 241-251), uses the coupling resonance wavelength of the incident light as the detection mechanism for the dual grating chip, which performs the detection by determining the variation of the coupling resonance wavelength using the light source with periodic variation. In addition, Darwish et al. (Darwish et al., Multi-analytic grating coupler biosensor for differential binding analysis. Sensors and Actuators B: Chemical. 2010. 144(2): 413-417) use the angle variation of the emergent light as the detection mechanism for the dual grating chip. However, the measurement for the angle and the wavelength variation of the light source needs a more precise measurement instrument, and thus the cost for the detection apparatus is high. Furthermore, the operational steps of the measurement instrument are complicated, and a longer detection time is required.

Currently, the manufacturing method of the conventional grating biosensor includes imprinting, ion etching and holographic methods. However, the molds used in these methods are easily damaged during the production process so that the usage frequency is too low, which results in increased manufacturing costs and reduced profitability. Thus, the conventional grating biosensors are not suitable for mass production.

Therefore, the issues about how to avoid having expensive measurement instruments during the measurement, simplifying the operational steps, shortening the detection time and decreasing the production costs of the optical biosensor are urgently in need of a solution for the optical biosensor.

It is therefore the Applicant's attempt to deal with the above situation encountered in the prior art.

SUMMARY OF THE INVENTION

In accordance with one aspect of the present disclosure, a dual grating sensing system for detecting at least one property of an analyte is disclosed. The dual grating sensing system includes: a substrate; a waveguide layer formed on the substrate, wherein the waveguide layer has a first double-sided grating structure and a second double-sided grating structure; an upper cover covered on the first double-sided grating structure and the second double-sided grating structure to form a channel between the waveguide layer and the upper cover, wherein the analyte flows in the channel; and a light source emitting a light, wherein the light couples into the waveguide layer via the first double-sided grating structure, and couples out of the waveguide layer via the second double-sided grating structure to detect the at least one property of the analyte, wherein the first and the second double-sided grating structures have a first sensitivity and a second sensitivity respectively, and a total sensitivity of the dual grating sensing system has an additive effect by the light passing through the first double-sided grating structure and the second double-sided grating structure.

In accordance with another aspect of the present disclosure, a dual grating sensor for detecting at least one property of an analyte is disclosed. The dual grating sensor includes: a substrate having a first concavo-convex surface and a second concavo-convex surface; a waveguide layer formed on the substrate, wherein the waveguide layer includes an upper surface, a first concavo-convex part corresponding to the first concavo-convex surface and a second concavo-convex part corresponding to the second concavo-convex surface, and each of the first concavo-convex part and the second concavo-convex part forms a double-sided grating structure; and an upper cover having an inner surface and covered on the waveguide layer, wherein a channel is formed by the inner surface and the upper surface to accommodate the analyte, wherein a light couples into and out of the waveguide layer via the two double-sided grating structures to detect the at least one property of the analyte, and the first and the second concavo-convex parts have their own sensitivity.

In accordance with one more aspect of the present disclosure, a method for manufacturing the dual grating sensor is disclosed. The method includes steps of: producing a mold having a dual grating pattern; forming a transparent plastic in the mold to obtain the substrate; forming the waveguide layer on the substrate to obtain the dual double-sided grating structure; and adhering the upper cover to the dual double-sided grating structure to form the channel between the waveguide layer and the upper cover to pass therethrough the analyte, and to obtain the dual grating sensor.

In accordance with one more aspect of the present disclosure, a method for detecting at least one property of an analyte, including: providing the dual grating sensor and a light source; guiding the analyte into the dual grating sensor, wherein the analyte directly contact any one side of the dual double-sided grating structure; emitting a light; and detecting the at least one property of the analyte by coupling the light into and out of the waveguide layer via the dual double-sided grating structures.

BRIEF DESCRIPTION OF THE DRAWINGS

Other objectives, advantages and efficacies of the present invention will be described in detail below taken from the preferred embodiments with reference to the accompanying drawings.

DETAILED DESCRIPTION OF THE PREFERRED EMBODIMENTS

Figure 1:
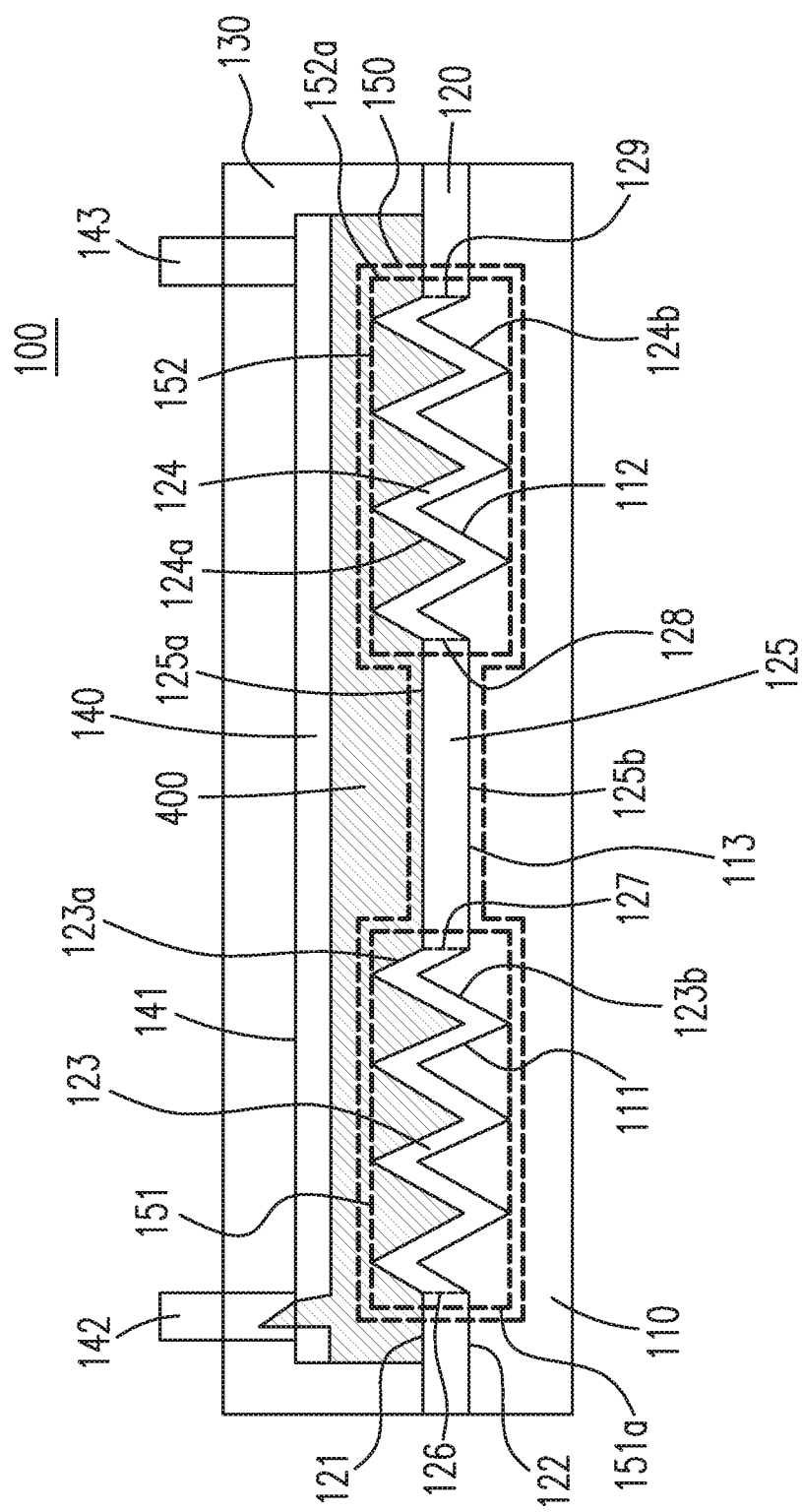
FIG. 1 is a structural schematic diagram showing the dual grating sensor in the present invention.

The present invention will now be described more specifically with reference to the following embodiments. It is to be noted that the following descriptions of preferred embodiments of this invention are presented herein for purpose of illustration and description only; they are not intended to be exhaustive or to be limited to the precise form disclosed. In the preferred embodiments, the same reference numeral represents the same element in each embodiment.

Due to the drawbacks in the prior art, one purpose of the present invention is to provide a dual grating sensor having a waveguide layer with two double-sided gratings to detect the properties of an analyte, wherein the light within the default ranges of the waveguide layer can effectively couple into the waveguide layer so as to perform detections. The sensitivity and the detection capability of the dual grating sensor in the present invention can be enhanced by the double coupling effect that the light couples into and out of the waveguide layer.

Please refer to FIG. 1, which is a structural schematic diagram showing the dual grating sensor in the present invention. In FIG. 1, the dual grating sensor 100 of the present invention includes a substrate 110, a waveguide layer 120 and an upper cover 130.

The substrate 110 has a first concavo-convex surface 111, a second concavo-convex surface 112 and a plane 113 configured between the first concavo-convex surface 111 and the second concavo-convex surface 112. Each of the first concavo-convex surface 111 and the second concavo-convex surface 112 has a plurality of concavo-convex structures with a regular shape. The material of the substrate 110 in the present invention can be, for example, cyclo-olefin copolymers (COCs), polycarbonate, acrylic, polypropylene, or other plastic materials with high transparency.

The waveguide layer 120 is formed on the surface of the substrate 110. The waveguide layer 120 has an upper surface 121 and a lower surface 122, wherein the lower surface 122 is formed on the surface of the substrate 110. The waveguide layer 120 includes a first concavo-convex part 123, a second concavo-convex part 124 and a rectangular light channel 125. The first concavo-convex part 123 and the second concavo-convex part 124 are respectively formed at the positions corresponding to the first concavo-convex surface 111 and the second concavo-convex surface 112, and the shapes of the first concavo-convex part 123 and the second concavo-convex part 124 also respectively correspond to those of the first concavo-convex surface 111 and the second concavo-convex surface 112. The rectangular light channel 125 is formed between the first concavo-convex part 123 and the second concavo-convex part 124, and situated at the position corresponding to the plane 113 of the substrate 110. The upper surface and the lower surface of the first concavo-convex part 123 respectively are a first grating 123a and a second grating 123b, and thus the first concavo-convex part 123 is a first double-sided grating structure 151. The upper surface and the lower surface of the second concavo-convex part 124 respectively are a third grating 124a and a fourth grating 124b, and thus the second concavo-convex part 124 is a second double-sided grating structure 152. The upper surface and the lower surface of the rectangular light channel 125 are a first surface 125a and a second surface 125b respectively. The second grating 123b, the second surface 125b and the fourth grating 124b are connected to form the lower surface 122 of the waveguide layer 120 which is formed on the surface of the substrate 110. The first grating 123a, the first surface 125a and the third grating 124a are connected to form the upper surface 121 of the waveguide layer 120, and the channel 140 is formed and surrounded by the waveguide layer 120 and the upper cover 130. Therefore, the first double-sided grating structure 151, the rectangular light channel 125 and the second double-sided grating structure 152 are combined to form a dual double-sided grating structure 150 of the present invention. It is practicable for the dual grating sensor 100 of the present invention to include more than two double-sided grating structures.

The waveguide layer 120 is formed on the surface of the substrate 110 using a deposition method. The deposition method includes sputtering, evaporation deposition, dip coating, spin coating or other methods that the waveguide layer 120 can be deposited on the surface of the substrate 110. Therefore, the waveguide layer 120 can be uniformly and smoothly formed on the surface of the substrate 110. The material of the waveguide layer 120 can be titanium dioxide, silicon dioxide, titanium(III) oxide, tantalum pentoxide or zinc oxide.

The upper cover 130 is of the material being e.g. cyclo-olefin copolymers (COCs), polycarbonate, acrylic, polypropylene or other plastic materials with high transparency, and covers on the upper surface 121 of the waveguide layer 120 of the present invention. Therefore, a space is formed between the inner surface 141 of the upper cover 130 and the upper surface 121 of the waveguide layer 120. The space is a channel 140 for accommodating the analyte 400. The upper cover 130 includes an entrance 142 and an exit 143 which are respectively configured at two ends of the channel 140, wherein the entrance 142 is configured at the end position corresponding to the first double-sided grating structure 151 and the exit 143 is configured at the other end position corresponding to the second double-sided grating structure 152. The analyte 400 is guided into the channel 140 from the entrance 142, sequentially flows through the first doubled-sided grating structure 151, the rectangular light channel 125 and the second doubled-sided grating structure 152, and then is evenly distributed over the upper surface 121 of the waveguide layer 120. After detection, the detected analyte 400 is guided out of the channel 140 from the exit 143.

In a preferred embodiment, the size of the dual grating sensor of the present invention is 45 mm(L)×20 mm(W)×2 mm(H), the size of the channel is 36 mm(L)×3 mm(W)×0.2 mm(H), and the size of each of two double-sided grating structures is 5 mm(L)×5 mm(W). The distance between two double-sided grating structures is 10 mm. In another embodiment, the size of two double-sided grating structures can be different, and the distance therebetween can be modified.

The analyte being detected by the dual grating sensor of the present. Invention can be the labeled analyte that a conjugation reaction is performed or the label-free analyte that the conjugation reaction is not necessary. Therefore, the dual grating sensor of the present invention can be applied to a variety of chemical reactions and biological detections.

A characteristic of the dual grating sensor of the present invention is that the material of the waveguide layer has high refractive index (RI) and stable chemical properties so that the detection sensitivity and the detection range of the dual grating sensor of the present invention are enhanced.

Figure 2:
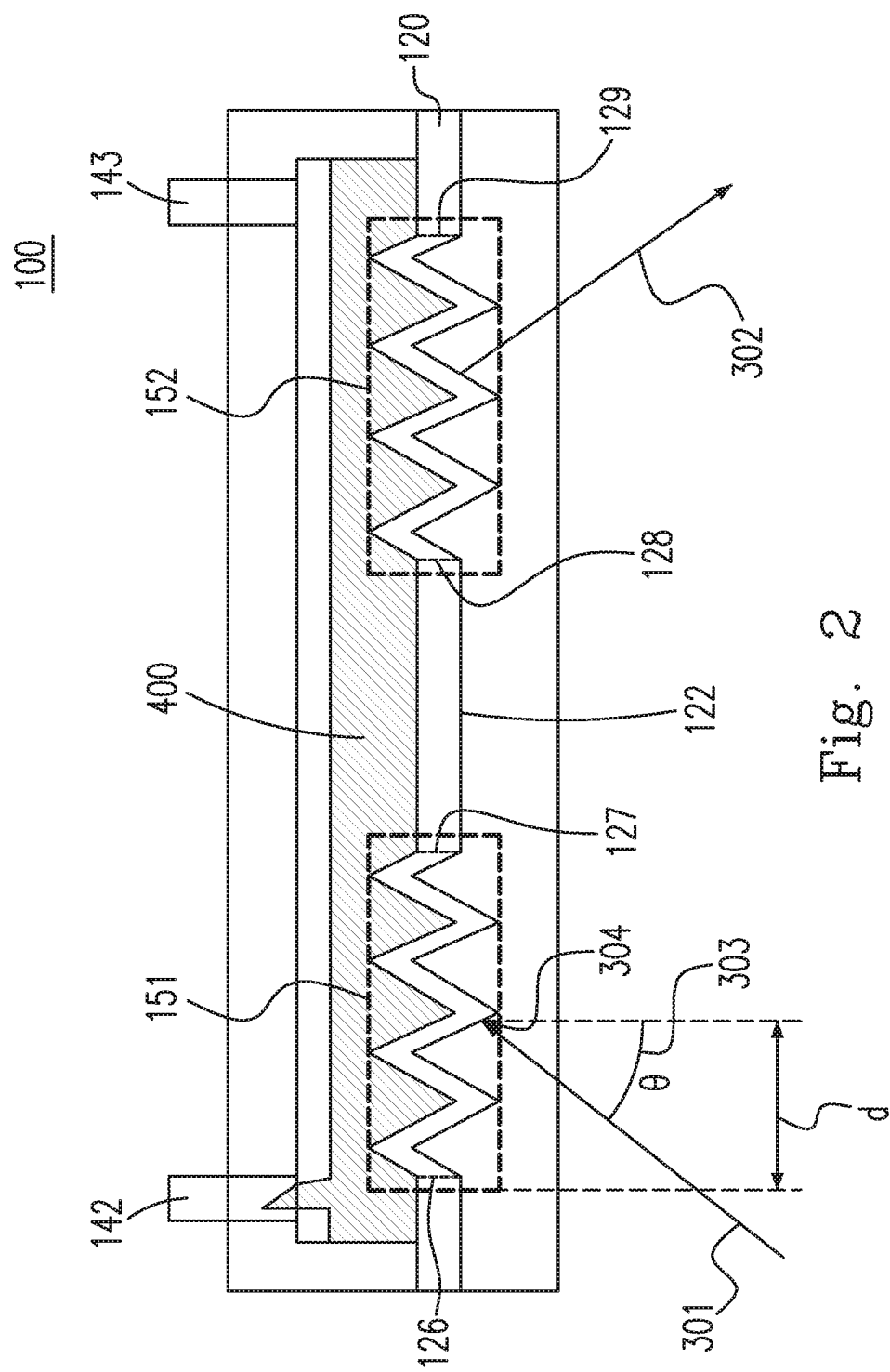
FIG. 2 is a schematic diagram showing that the light couples into and couples out of the waveguide layer of the dual grating sensor in the present invention.

Please refer to FIGS. 1 and 2, which show that the light couples into and couples out of the waveguide layer of the dual grating sensor (FIG. 1) in the present invention. According to the structure of the dual grating sensor 100 of the present invention, the first double-sided grating structure 151 of the waveguide layer 120 includes a first end 126 and a second end 127, and the second double-sided grating structure 152 of the waveguide layer 120 includes a third end 128 and a fourth end 129. An incident light 301 couples into the waveguide layer 120 from the lower surface 122 of the first double-sided grating structure 151 with a specific incident angle ($\theta$) 303 (or called an input coupling angle) and irradiates at the coupling position 304 (or called an input coupling position) between the first end 126 and the second end 127. The coupled light transmits within the waveguide layer 120, passes through the first double-sided grating structure 151, the rectangular light channel 125 and the second double-sided grating structure 152, and finally couples out of the waveguide layer 120 from the lower surface 122 of the second double-sided grating structure 152 with an emergent angle (or called an output coupling angle) and emits out at the position (i.e. an output coupling position) between the third end 128 and the fourth end 129. The light which couples out of the waveguide layer 120 is an emergent light 302.

The emergent light 302 has different light intensities because of the properties, e.g. the refractive index, of different analytes 400, and the properties of the analyte can be analyzed according to the corresponding relationship between the refractive index of the analyte and the emergent light intensity.

Figure 3:
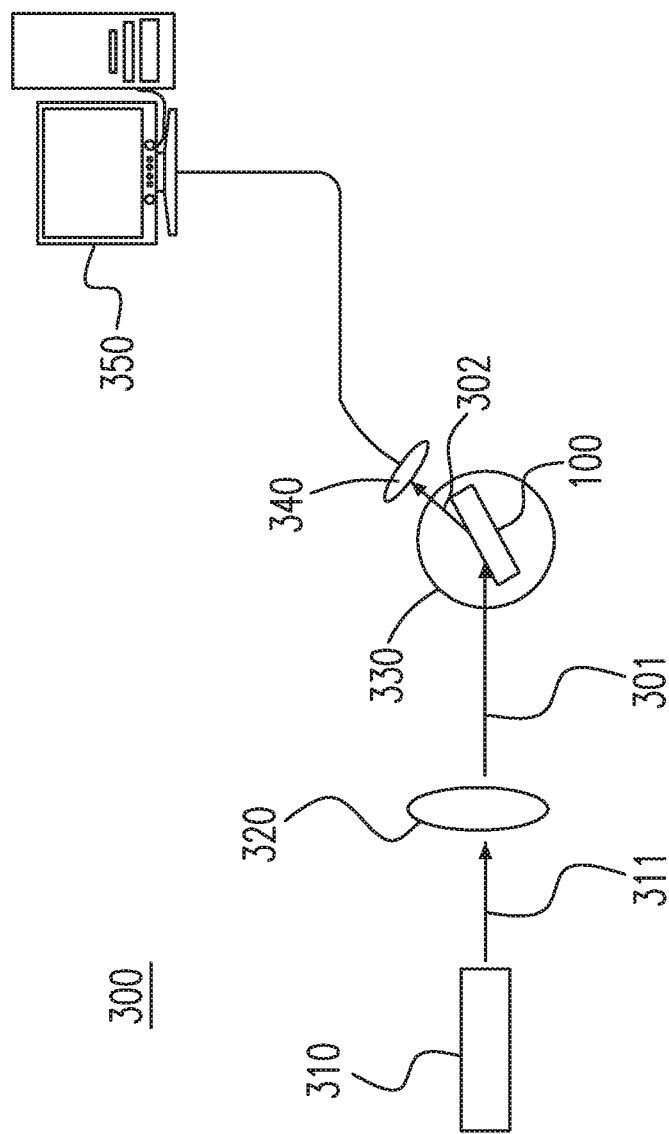
FIG. 3 is a schematic diagram showing the dual grating sensing system in the present invention.
Figure 4:
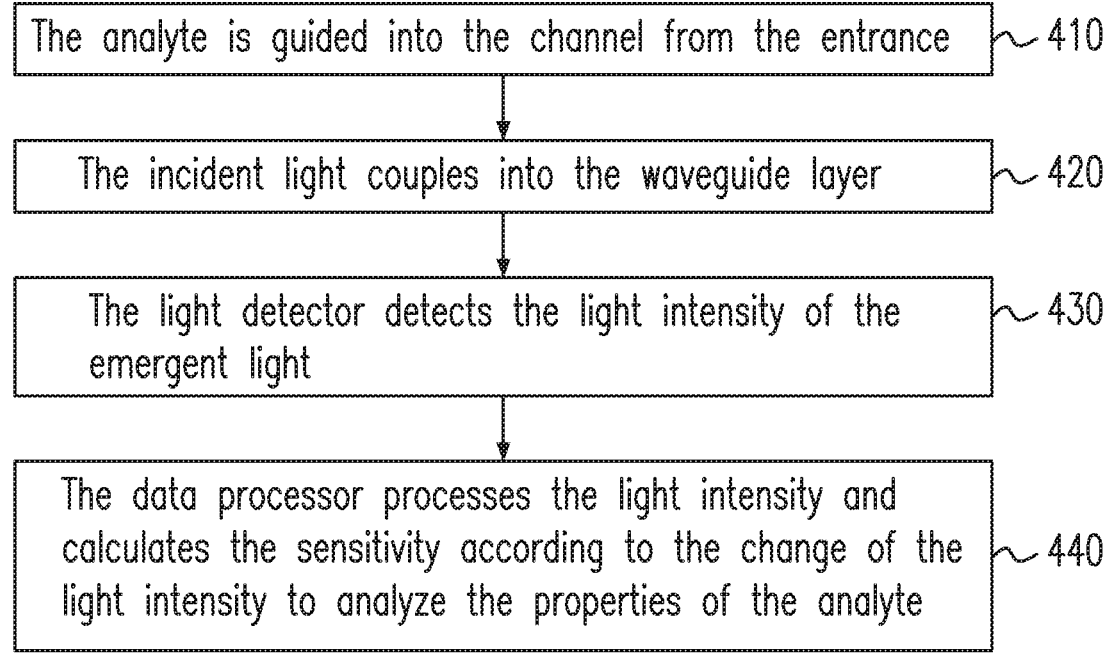
FIG. 4 is a flowchart showing the detection method of the dual grating sensor in the present invention.

Please refer to FIGS. 3 and 4, wherein FIG. 3 is a schematic diagram showing the dual grating sensing system in the present invention, and FIG. 4 is a flowchart showing the detection method of the dual grating sensor in the present invention. The dual grating sensing system 300 includes a light source 310, an optical element 320, a dual grating sensor 100, a light detector 340 and a data processor 350. As shown in FIGS. 3 and 4, the detection method using the dual grating sensing system 300 of the present invention is described as follows: the analyte 400 is firstly guided into the channel 140 from the entrance 142 (step 410), wherein the analyte directly contact any one side of the dual double-sided grating structure. The incident light 301 is subsequently coupled into the waveguide layer 120 from the first double-sided grating structure 151 (step 420). In detail, the incident light 301 can be generated from a laser 311 which emits from the light source 310 and passes through the optical element 320. When the incident light 301 arrives at the lower surface 122 of the waveguide layer 120, the incident light 301 couples into the waveguide layer 120 from the first doubled-sided grating structure 151. After passing through the rectangular light channel 125, the coupled light couples out of the waveguide layer 120 from the second doubled-sided grating structure 152 and becomes the emergent light 302. In addition, the optical element 320 above can be beam splitters, neutral density filters, optical filters, polarizers, apertures, pinholes, convex lenses, elements that can change the direction or spot size of the laser or elements that can change the properties of the laser.

When the emergent light 302 couples out of the waveguide layer 120, the light detector 340 detects the light intensity of the emergent light 302 (step 430), and the data processor 350 processes the light intensity detected by the light detector 340 and calculates the sensitivity according to the change of the light intensity to analyze the properties of the analyte 400 (step 440).

To prove that the refractive index of an analyte can be known by the dual grating sensor of the present invention by detecting the light intensity, a sucrose solution acts as the analyte 400, and the experimental results and the effect are shown as follows:

Experiment for the Sucrose Solution

Figure 5:
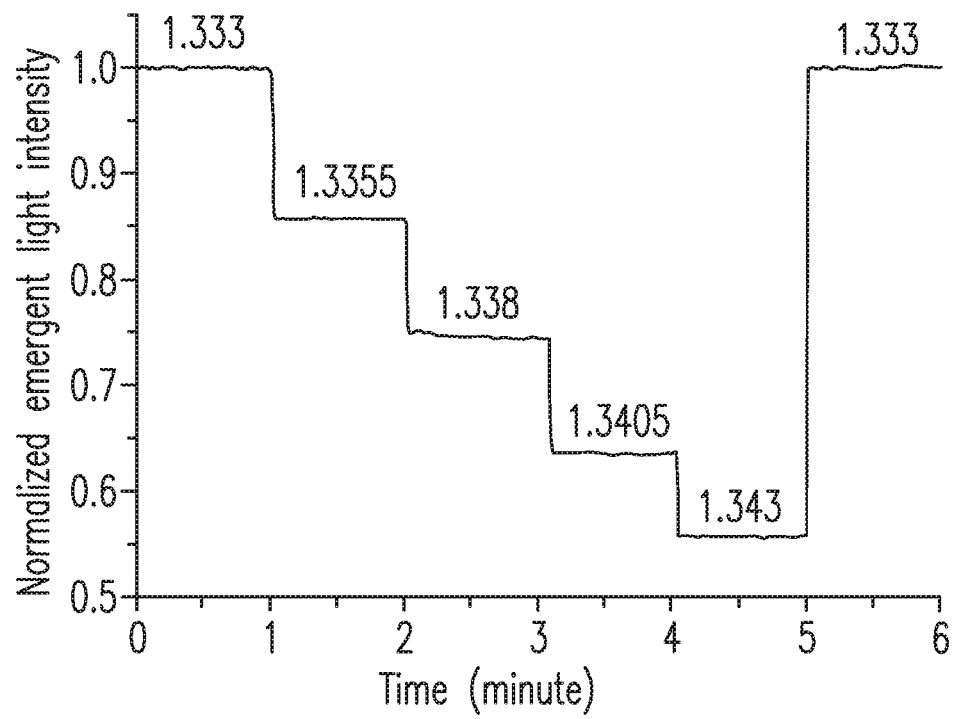
FIG. 5 is a schematic diagram showing the real-time signal variations of the light intensity of the emergent light for different analytes in the dual grating sensor in the present invention.

Before detecting the sucrose solution, deionized water is guided into the channel from the entrance to set a reference signal value. The sucrose solutions with refractive indexes of 1.3355, 1.3380, 1.3405 and 1.343 are successively guided into the channel of the dual grating sensor, and then the deionized water is guided into the channel again. The signal value for each refractive index of the sucrose solution is detected for 1 minute, and then the change for the signal values of the sucrose solutions with different refractive indexes can be obtained. The detection result is shown in FIG. 5. In FIG. 5, sucrose solutions with different refractive indexes individually correspond to different signal strengths, wherein the relative intensity of the emergent light (the longitudinal axis) in FIG. 5 is the ratio of the light intensity of the sucrose solution to that of the deionized water (RI of 1.333). Therefore, the refractive index of the sucrose solution can be obtained by the detected signal strengths. According to FIG. 5, it can be known that the higher refractive index of the sucrose solution corresponds to the lower relative intensity of the emergent light.

Figure 6:
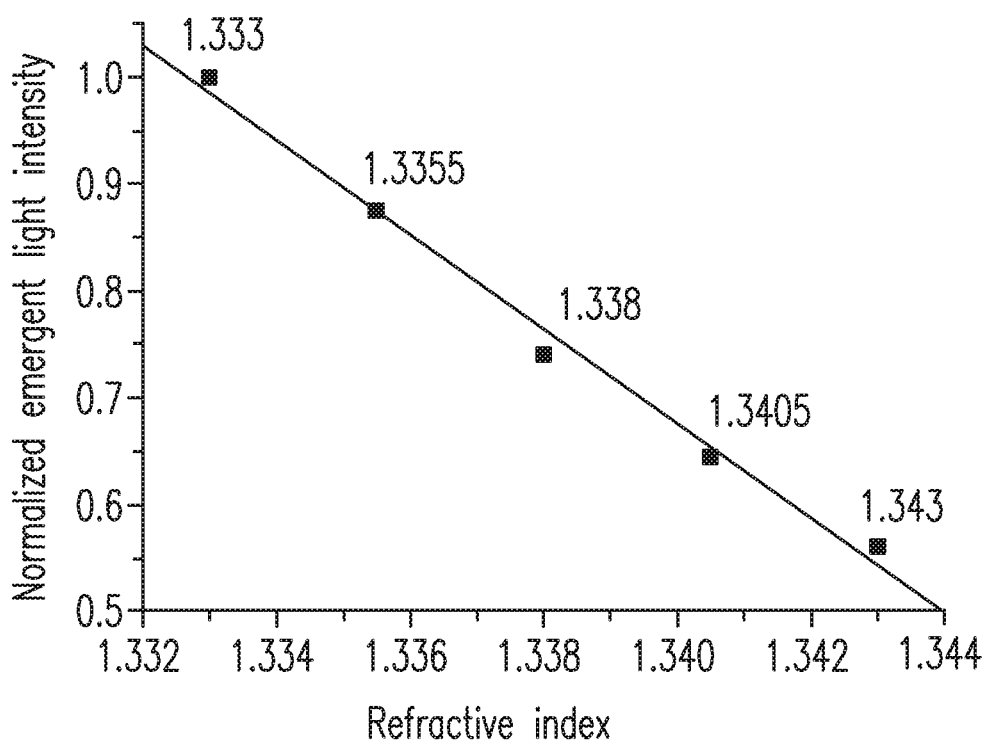
FIG. 6 is a schematic diagram showing the relationship between the light intensity of the emergent light of the dual grating sensor and the refractive index of the analytes in the present invention.

Please refer to FIG. 6, which is a schematic diagram showing the relationship between the light intensity of the emergent light and the refractive index of the analyte of the dual grating sensor in the present invention. FIG. 6 is a calibration curve plotted based on the detection results in FIG. 5, wherein the horizontal axis shows the refractive indexes of the sucrose solution and deionized water, the vertical axis shows the emergent light intensity, and the linear fit slope shows the sensitivity of the dual grating sensor. The data processor 350 can calculate the sensitivity and the resolution of the dual grating sensor of the present invention according to the emergent light intensity. The calculation result shows that the average sensitivity of the dual grating sensor of the present invention is $-46.42\pm2.23$ $RUI^{-1}$.

Additive Effect of the Dual Grating Sensor

Figure 7A:
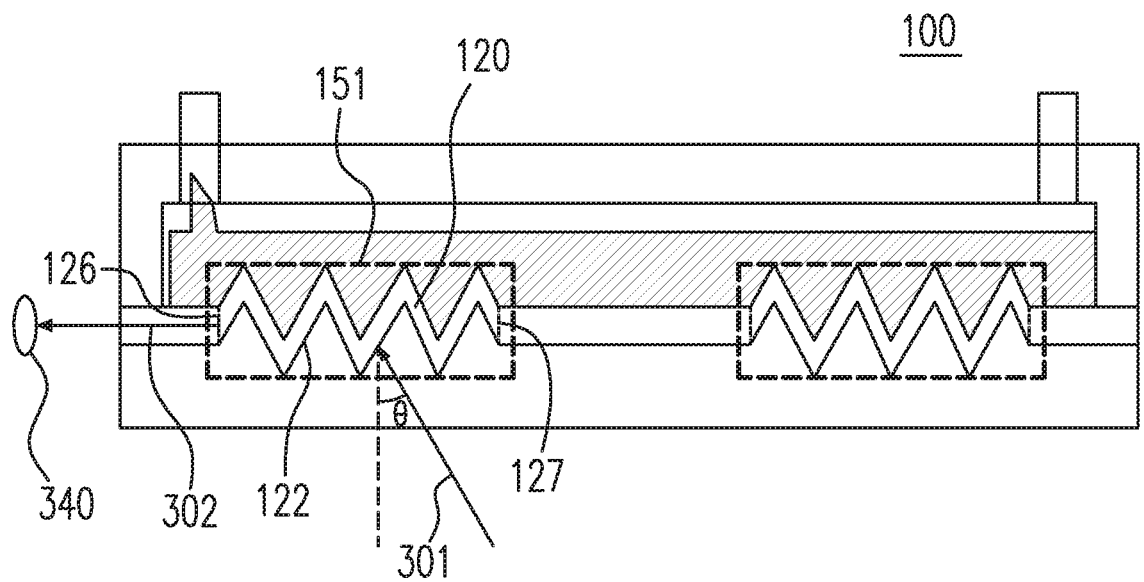
FIG. 7(A) is a schematic diagram showing the sensitivity test for the first dual grating structure of the dual grating sensor in the present invention.
Figure 7B:
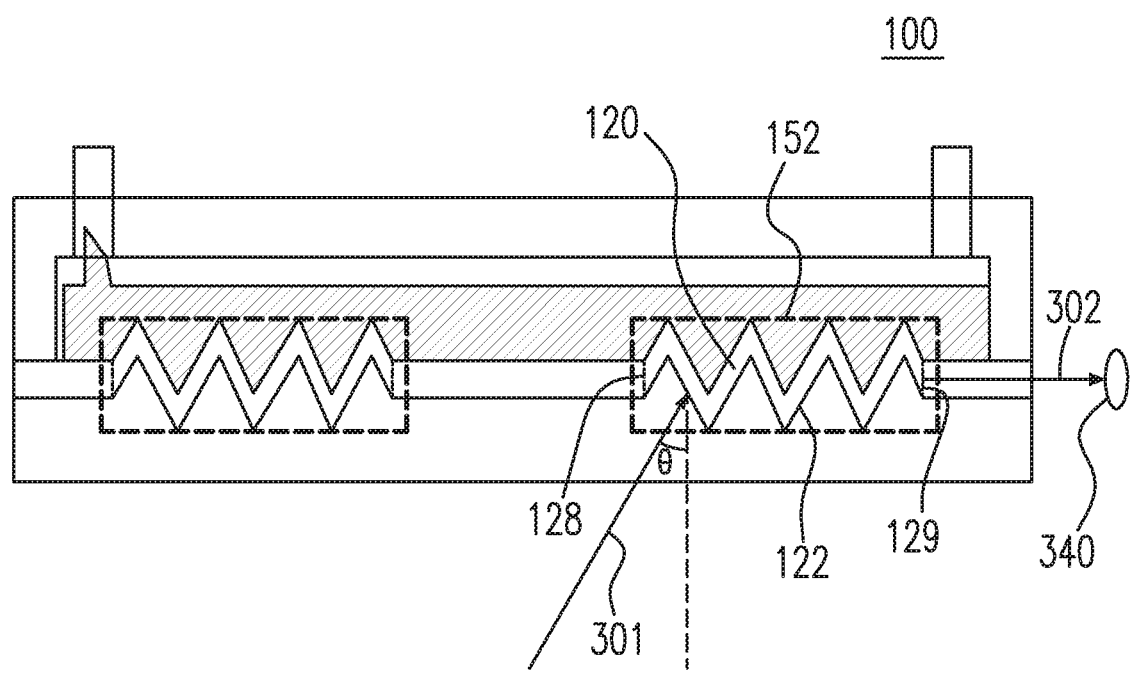
FIG. 7(B) is a schematic diagram showing the sensitivity test for the second dual grating structure of the dual grating sensor in the present invention.
Figure 8:
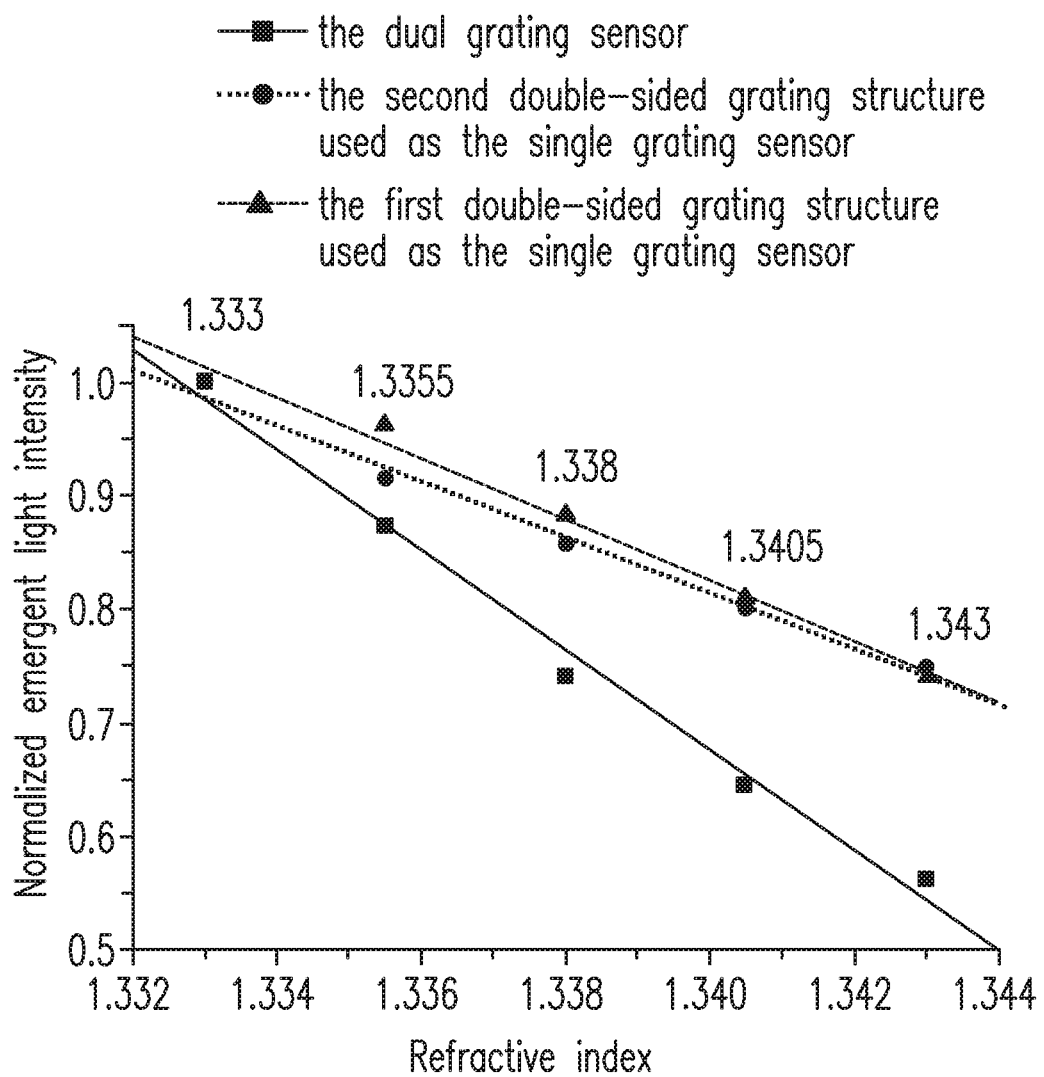
FIG. 8 is a schematic diagram showing the relationships between the light intensity of the emergent light and the refractive index of the analytes in the dual grating sensor of the present invention and the two single grating sensors.

To compare the sensitivities of the dual grating sensor and the single grating sensor, the sensitivity of the single grating sensor is detected using the dual grating sensor of the present invention. That is, the sucrose solutions with different refractive indexes are detected using the first double-sided grating structure 151 and the second double-sided grating structure 152 of the dual grating sensor 100 of the present invention respectively. Therefore, each of the first double-sided grating structure 151 and the second double-sided grating structure 152 acts as a single grating sensor (as shown in FIGS. 7(A) and 7(B)), and has its own sensitivity. That is, the first double-sided grating structure 151 has a first sensitivity, the second double-sided grating structure 152 has a second sensitivity, and the dual grating sensor 100 has a total sensitivity. Please refer to FIG. 7(A), when the first double-sided grating structure 151 acts as the single grating sensor, the incident light 301 couples into the waveguide layer 120 from the lower surface 122 and at the position near the second end 127 of the first double-sided grating structure 151, and couples out of the waveguide layer 120 from the first end 126 of first double-sided grating structure 151. The light intensity of the emergent light 302 is detected by the light detector 340. Please refer to FIG. 7(B), when the second double-sided grating structure 152 acts as the single grating sensor, the incident light 301 couples into the waveguide layer 120 from the lower surface 122 and at the position near the third end 128 of the second double-sided grating structure 152, and couples out of the waveguide layer 120 from the fourth end 129 of the second double-sided grating structure 152. The light intensity of the emergent light 302 is also detected by the light detector 340. The data of two detections above are normalized and incorporated with the results in FIG. 6 so as to obtain the relationships of the sensitivities among the dual grating sensor and two single grating sensors, as shown in FIG. 8. In FIG. 8, the average sensitivity of the first doubled-sided grating structure 151 (which acts as a single grating sensor) is $-27.57\pm0.56$ $RUI^{-1}$, that of the second doubled-sided grating structure (which acts as a single grating sensor) is $-24.25\pm0.40$ $RUI^{-1}$, and that of the dual grating sensor of the present invention is $-46.4\pm2.21$ $RUI^{-1}$. It is apparent that the total sensitivity of the dual grating sensor of the present invention is higher than the individual sensitivity of two single grating sensors. Therefore, the sensitivity of the dual grating sensor 100 of the present invention indeed is increased by the double coupling effect where the light couples into and out of the waveguide layer.

Please refer to FIG. 3 again, the dual grating sensor 100 of the present invention can be configured on a rotating plate 330, and the incident angle and the incident position of the incident light coupled into the waveguide layer 120 are adjusted by rotating the rotating plate 330, so as to obtain the largest coupling energy of the emergent light. The influence on the sensitivities at different incident angles (i.e. coupling angles) and different incident positions (i.e. coupling positions) for the dual grating sensor can be compared using different refractive indexes of sucrose solutions to figure out the preferred ranges of the incident angle and incident position.

The Relationship Between the Coupling Angle and the Property of the Dual Grating Sensor The deionized water and the sucrose solutions with refractive indexes of 1.3355, 1.3380, 1.3405 and 1.343 are individually guided into the channel 140 of the dual grating sensor 100. Firstly, the deionized water is guided into the channel 140, the incident light 301 couples into the waveguide layer 120 via the first double-sided grating structure 151 with the coupling angle (θ) 12.39°, and the light intensity of the emergent light couples out of the waveguide layer 120 via the second double-sided grating structure 152 is detected. Next, the sucrose solution with refractive index of 1.3355 is guided into the channel 140 using a syringe pump. The sucrose solutions with refractive indexes of 1.3355, 1.3380, 1.3405 and 1.343 are successively guided into the channel 140 every 1 minute. Finally, the deionized water is guided into the channel 140 again and detected for 1 minute to complete the detection cycle. The emergent light intensities of the sucrose solutions with each refractive index are detected at the coupling degrees of 12.39°, 12.19°, 11.99°, 11.79°, 11.59°, 11.39°, 11.19° and 11.09°, and the results are shown in FIG. 9.

Figure 9:
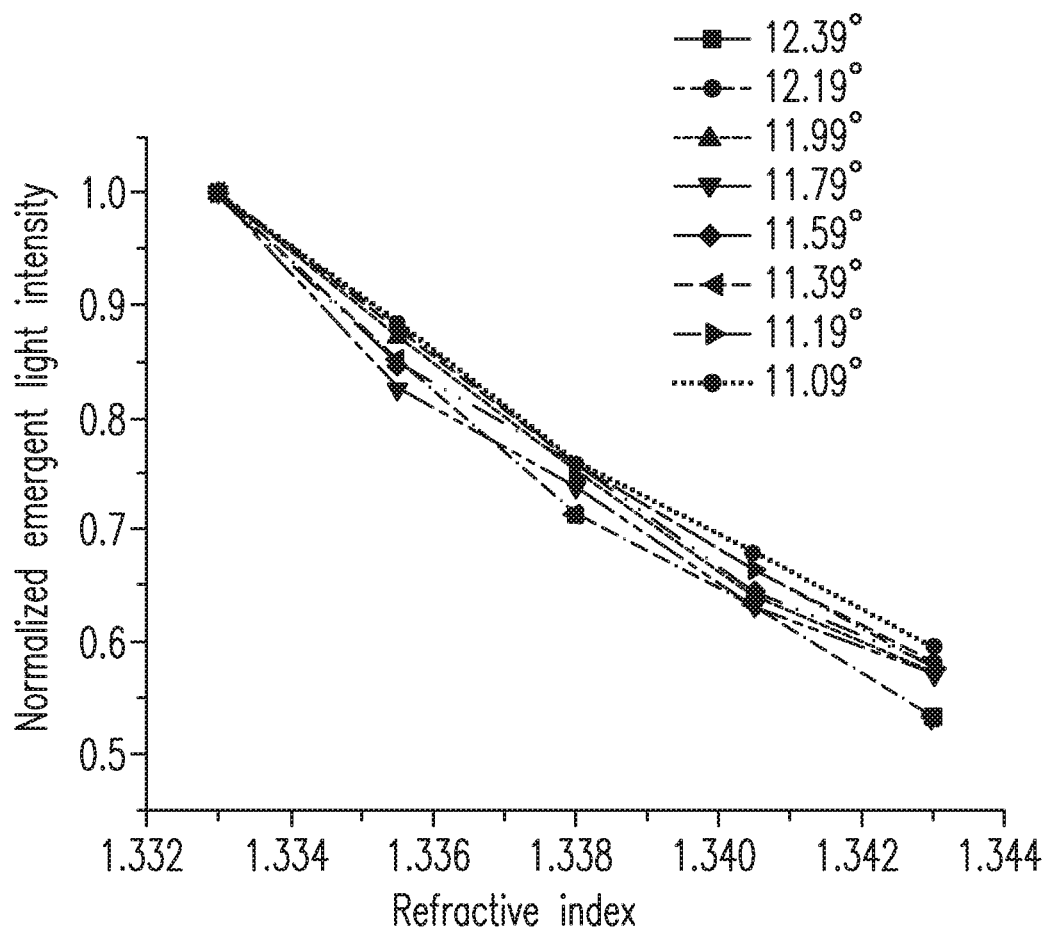
FIG. 9 is a schematic diagram showing the relationship between the light intensity of the emergent light and the refractive index of the analytes at different coupling angles in the dual grating sensor of the present invention.

It can be seen in FIG. 9 that the dual grating sensor has similar sensitivity at the coupling angle ranged between 12.39° and 11.19°. When the incident angle is continuously decreased, the emergent light can be still detected at 11.09°. Therefore, regardless of the coupling angle, the light intensity of the emergent light 302 has a linear relationship to the refractive index of the analyte 400. The preferred range of the coupling angle of the dual grating sensor is between 11.09° and 12.39°. The dual grating sensor has detection capability within these coupling angles, and the sensitivity thereof is $-42.54\pm1.29$ $RIU^{-1}$. In other words, the sensitivity of the dual grating sensor 100 of the present invention does not change with the variations of the coupling angle.

The Relationship Between the Coupling Position and the Property of the Dual Grating Sensor The coupling position is the site of the first double-sided grating structure 151 where the incident light couples into the waveguide layer 120. The influences on the sensitivity and the coupling energy of the dual grating sensor can be discussed based on the coupling position. After figuring out a best coupling angle, the incident light couples into the waveguide layer at the fixed coupling angle but at different coupling positions. Please refer to FIG. 2, the position at the first end 126 of the first double-sided grating structure 151 is defined as 0 mm, and the coupling position has a distance (d) from the first end 126. The coupling position will be shifted toward the second end 127 of the first double-sided grating structure 151 at 0.25 mm per detection until signal distortion or the apparently decreased sensitivity. Therefore, the deionized water is firstly guided into the channel 140 via the entrance 142, followed by coupling the incident light 301 into the waveguide layer 120 at the coupling position which is 0.5 mm from the first end 126 of the first double-sided grating structure 151, and finally the light intensity of the emergent light which couples out of the second double-sided grating structure 152 is detected. Next, the sucrose solution with the refractive index of 1.3355 is guided into the channel 140 using a syringe pump. The sucrose solution with one refractive index is injected per minute until the last sucrose solution (RI of 1.343). Finally, the deionized water is guided into the channel 140 again to wait for 1 minute to complete a detection cycle. The light intensities of the sucrose solutions with each refractive index are detected at different coupling positions being 1 mm, 1.5 mm, 2 mm, 2.5 mm, 3 mm, 3.5 mm, 4 mm, 4.5 mm and 5 mm from the first end 126, and the results are shown in FIG. 10.

Figure 10:
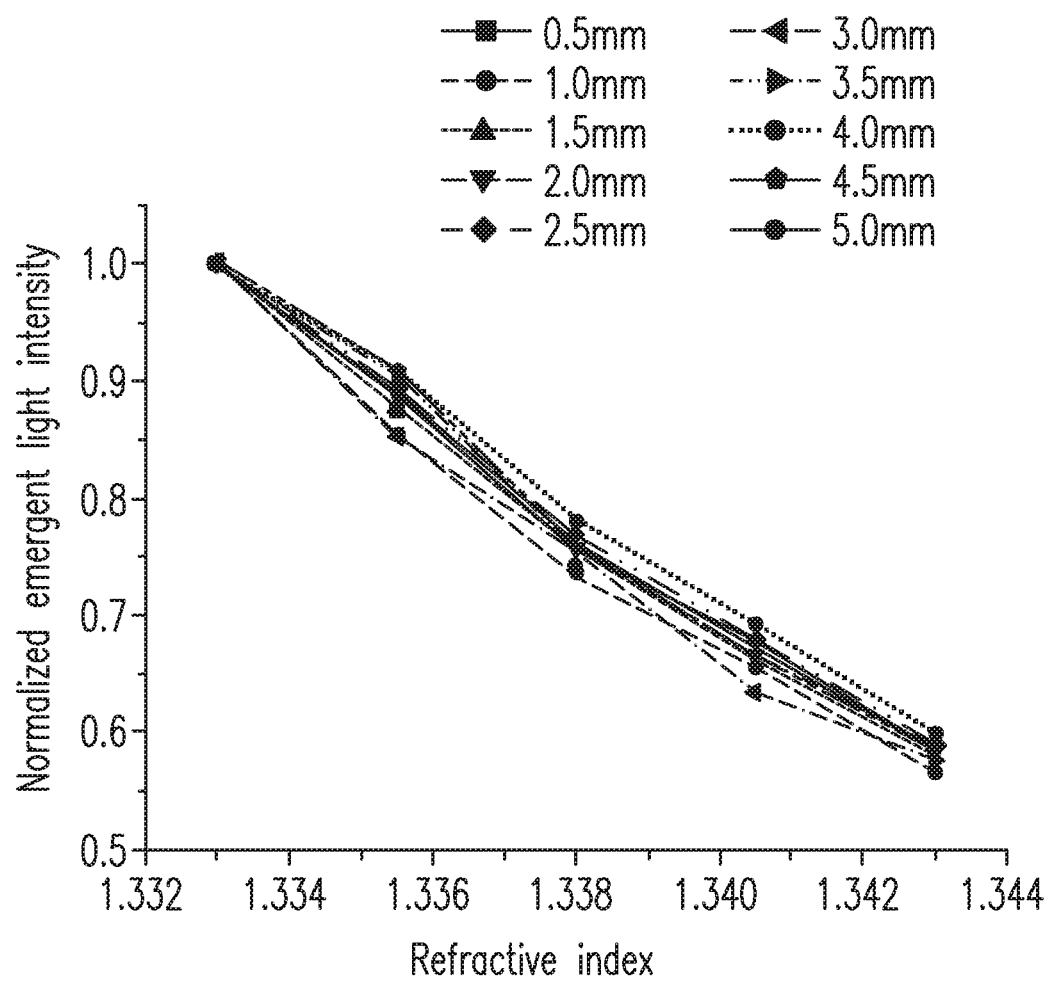
FIG. 10 is a schematic diagram showing the relationship between the light intensity of the emergent light and the refractive index of the analytes at different coupling positions in the dual grating sensor of the present invention.

It can be seen in FIG. 10 that there is a linear relationship between the detected light intensity and the refractive index of the analyte regardless of the distance (d) between the coupling positions and the first end 126 being 0.5 mm, 1 mm, 1.5 mm, 2 mm, 2.5 mm, 3 mm, 3.5 mm, 4 mm, 4.5 mm or 5 mm. Therefore, the dual grating sensor has a similar sensitivity $-41.96\pm0.84$ $RIU^{-1}$ at the coupling position between 0.5 mm and 5 mm. In other words, detection can be made using the dual grating sensor of the present invention, and detection sensitivity does not change with the variations of the coupling positions only if the coupling position is not positioned at the edge of the first double-sided grating structure.

Therefore, the coupling position and the coupling angle of the dual grating sensor do not vary with the change of a refractive index of the analyte.

Biochemical Experiment

On the other hand, the dual grating sensor 100 of the present invention also has biological detection capability. The biological detection capability of the dual grating sensor of the present invention on label-free analytes can be made by the immune interaction between dinitrophenyl (DNP) and anti-DNP. DNF and anti-DNP is a set of molecules for the label-free detection method for detecting the anti-DNP because there is not any label on the anti-DNP.

Figure 11:
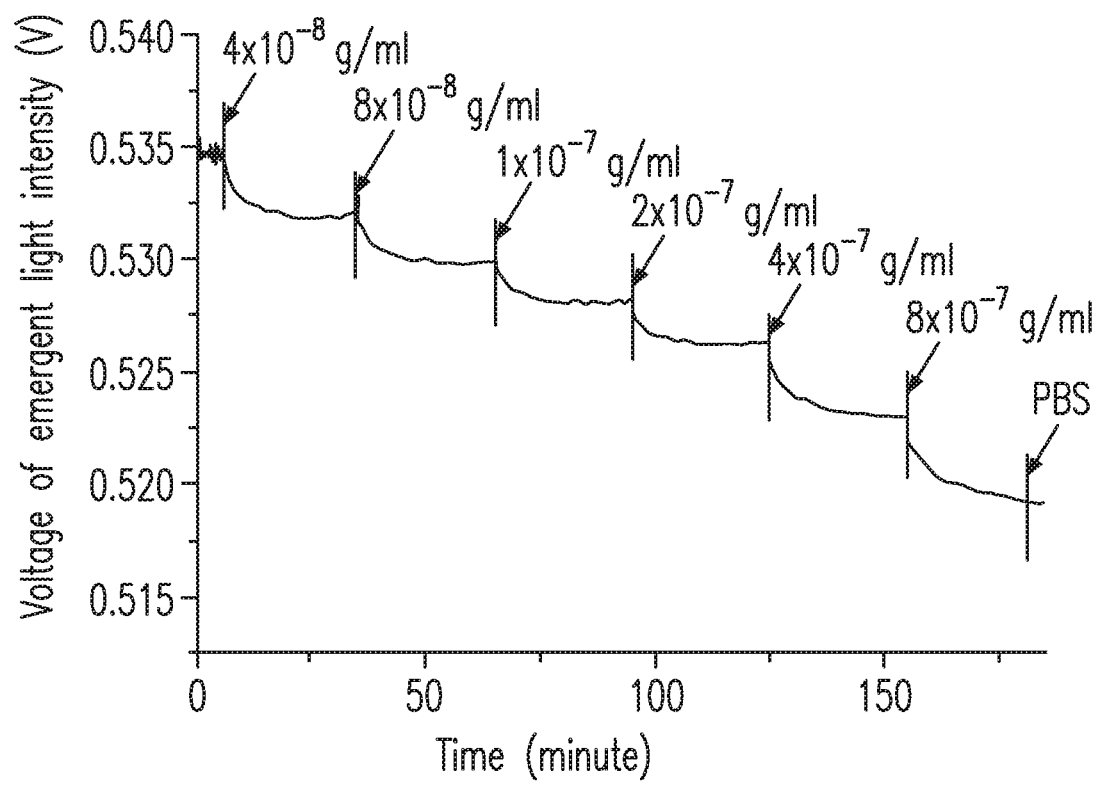
FIG. 11 is a schematic diagram showing the real-time signal variations of the anti-dinitrophenyl (anti-DNP) detected by the dual grating sensor of the present invention.
Figure 12:
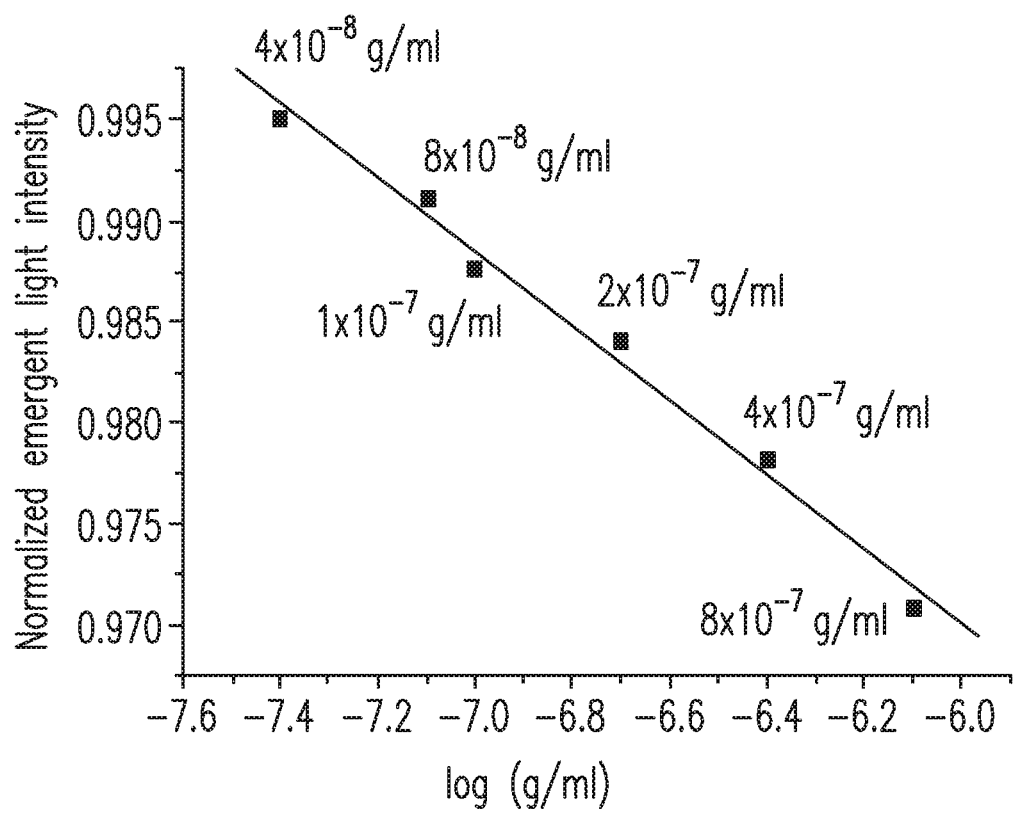
FIG. 12 is a schematic diagram showing a calibration curve of the anti-DNP detected by the dual grating sensor of the present invention.

Upon detecting the anti-DNP, phosphate buffered saline (PBS) is guided into the channel 140 and stayed to detect signals for 10 minutes. The anti-DNTs of $4\times10^{-8}$ g/ml, $8\times10^{-8}$ g/ml, $1\times10^{-7}$ g/ml, $2\times10^{-7}$ g/ml, $4\times10^{-7}$ g/ml and $8\times10^{-7}$ g/ml are sequentially guided into the channel 140 from the entrance 142, and signals for each concentration of anti-DNP are detected for 30 minutes. The PBS is guided again to wash the redundant and unbound anti-DNP to detect signals for 10 minutes. The results are shown in FIG. 11, and the calibration curve is shown in FIG. 12. After calculation, the limit of detection (LOD) of the dual grating sensor 100 of the present invention is determined as $2.73\times10^{-8}$ g/ml, the average LOD is $3.09\times10^{-8}\pm4.34\times10^{-9}$ g/ml, and the best LOD is $2.73\times10^{-8}$ g/ml.

Manufacturing Method of the Dual Grating Sensor

Figure 13:
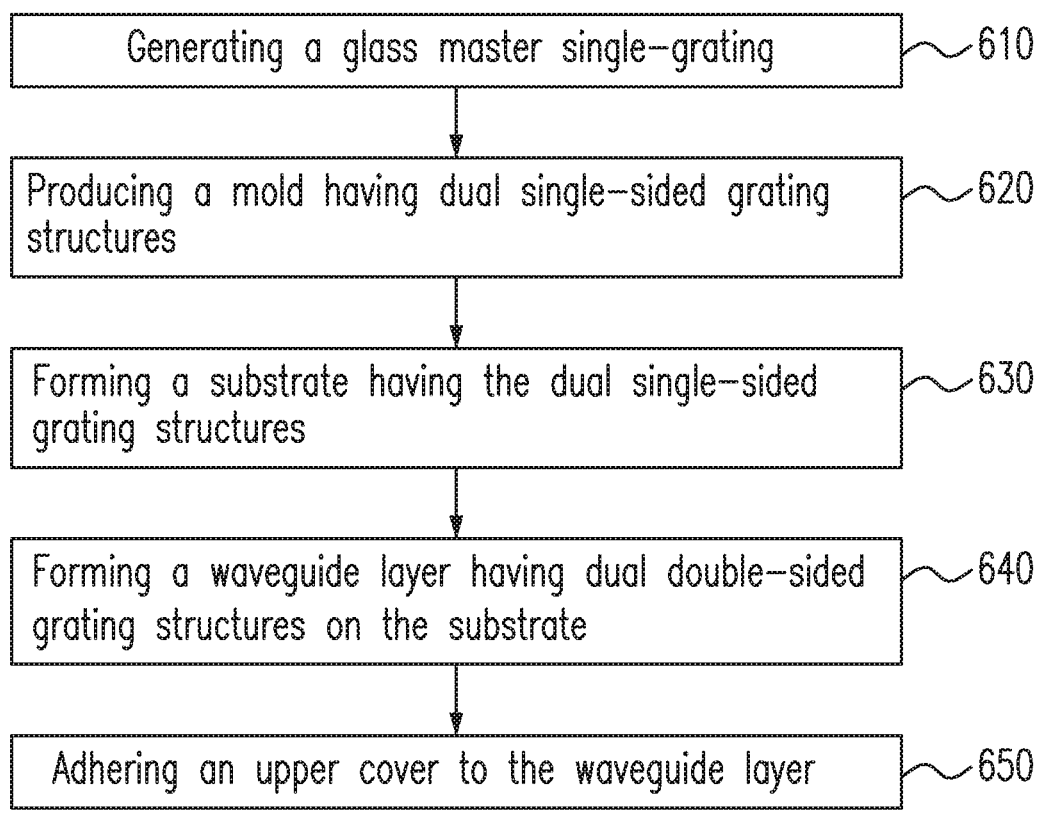
FIG. 13 is a flowchart showing the manufacturing method of the dual grating sensor in the present invention.
Figure 14:
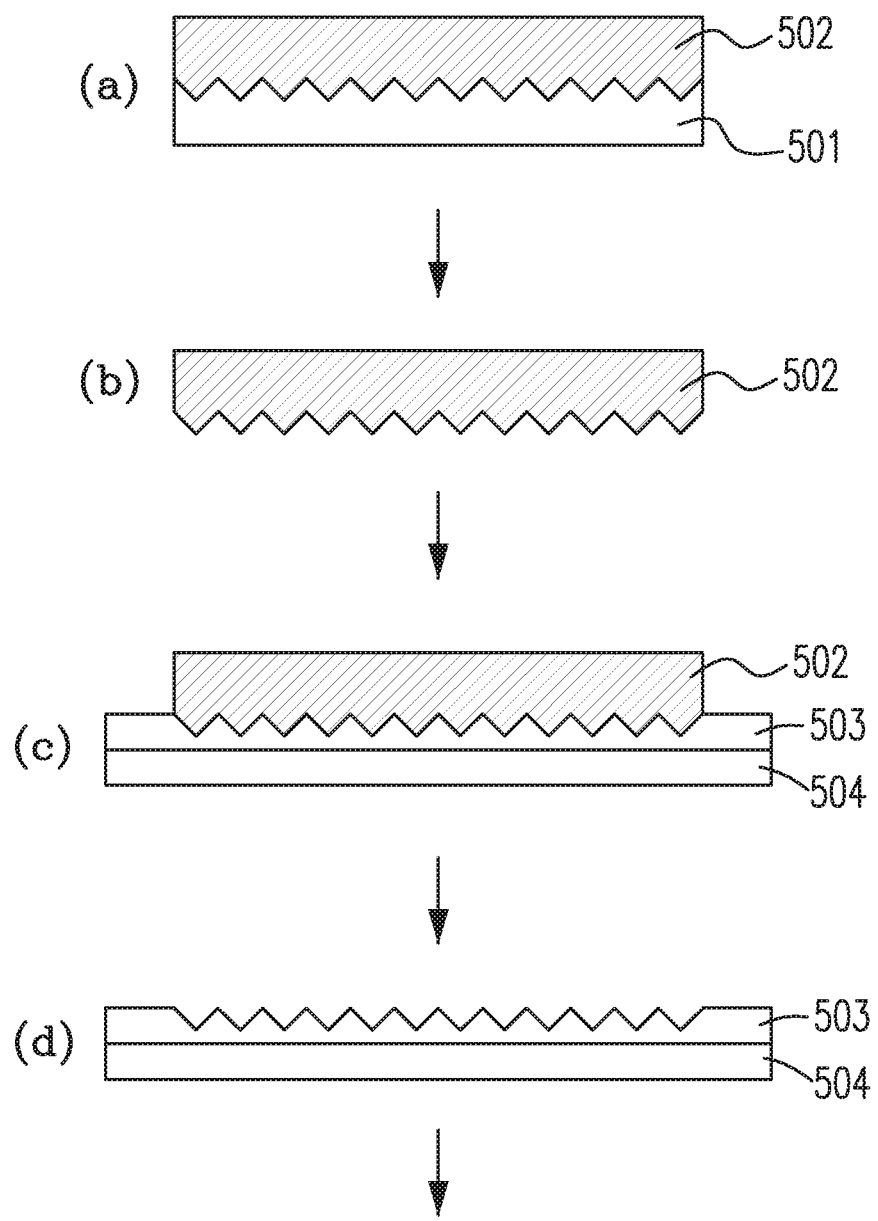
FIG. 14 is a sectional diagram showing the manufacturing process of the dual grating sensor in the present invention.
Figure 14:
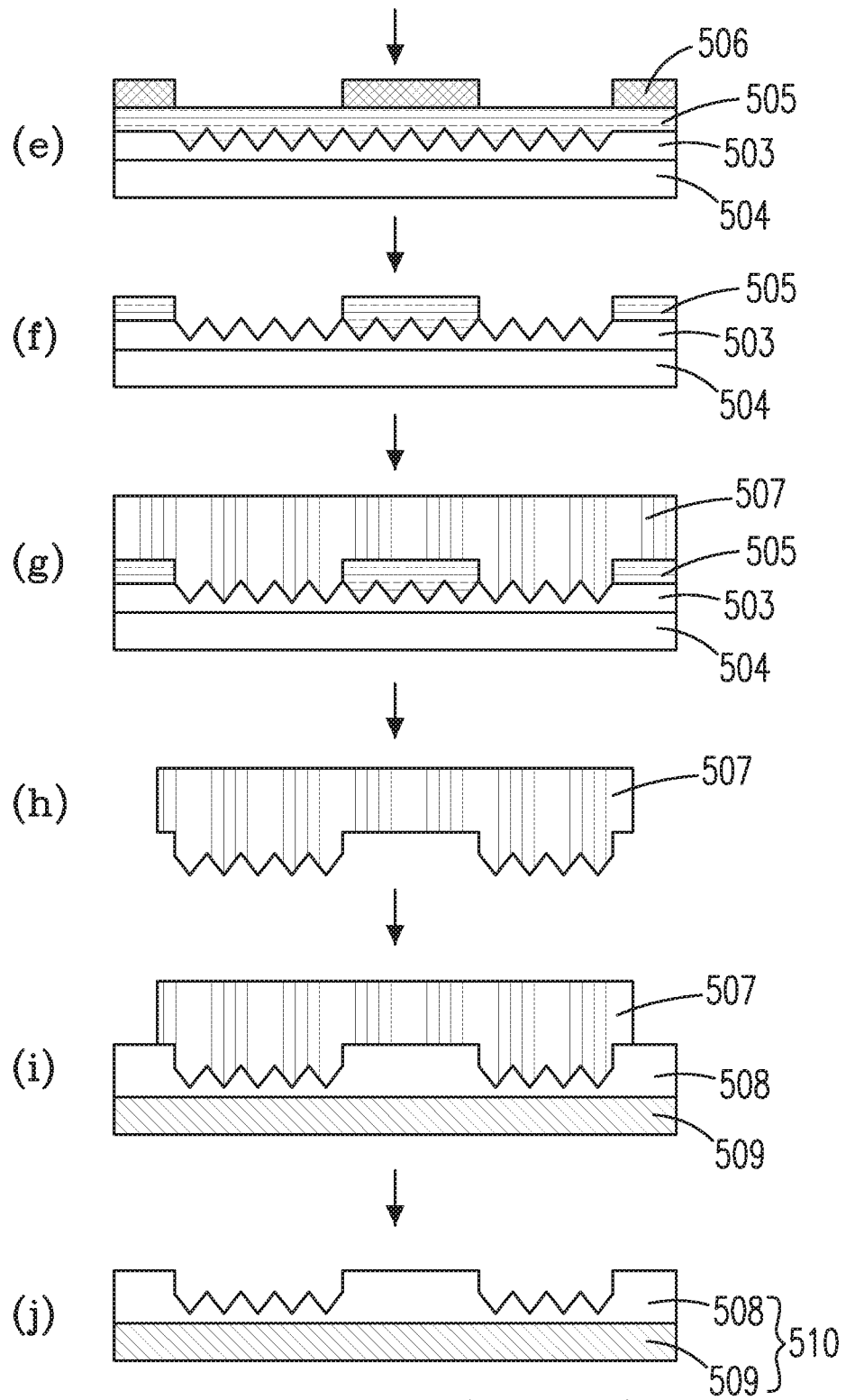
Figure 14:
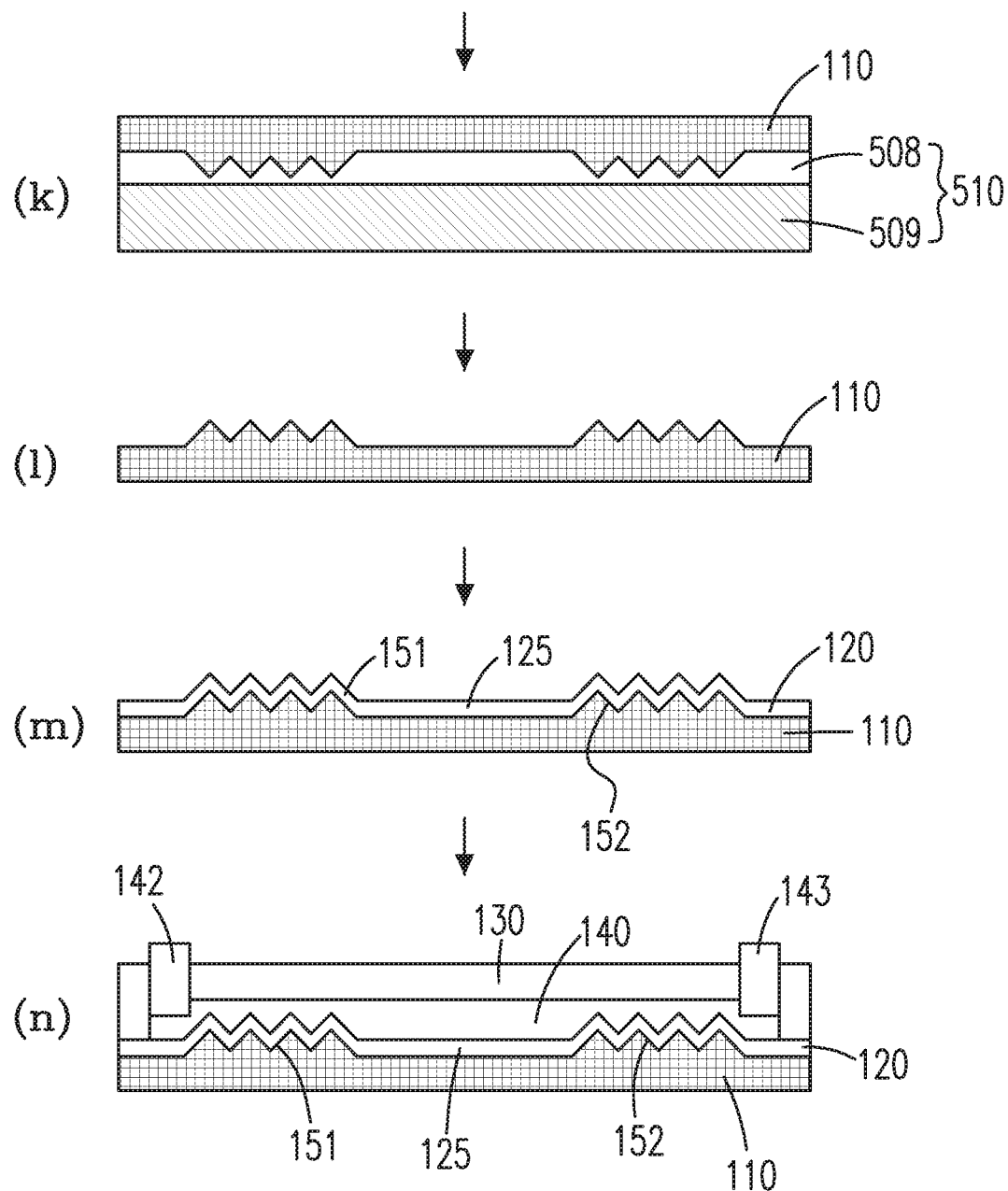

Please refer to FIGS. 13 and 14, wherein FIG. 13 is a flowchart showing the manufacturing method, and FIG. 14 is a sectional diagram showing the manufacturing process of the dual grating sensor in the present invention. As shown in FIG. 13, the manufacturing method of the dual grating sensor 100 of the present invention includes: (1) generating a glass master single-grating (step 610); (2) producing a mold having dual single-sided grating structures (step 620); (3) forming a substrate having dual single-sided grating structures (step 630); (4) forming a waveguide layer having dual double-sided grating structures on the substrate (step 640); and (5) adhering an upper cover to the waveguide layer (step 650).

The detailed manufacturing process is shown in FIG. 14. In step 610, polydimethylsiloxane (PDMS) reprints a single grating structure from a commercial holographic master grating 501 (2400 grooves/mm; Edmund Optical Inc., Barrington, N.J., U.S.A.) (step (a) in FIG. 14) to obtain a PDMS master single-grating 502 with a single-sided grating structure (step (b) in FIG. 14). Next, a sol-gel material is spin-coated on a glass substrate 504 to form a sol-gel layer 503, and then the PDMS master single-grating 502 is imprinted on the sol-gel layer 503 using a nanoimprint lithography method (step (c) in FIG. 14). The imprinted sol-gel layer 503 uses a sequential process of 30 minutes of soft baking at 70° C. in an oven, 20 minutes of UV light exposure and 12 hours of hard baking at 110° C. in an oven to produce the glass master single-grating (step (d) in FIG. 14).

In step 620, an S1818 mask is covered on the glass master single-grating using the lithography process to produce a mold having dual single-sided grating structures. In detail, an S1818 photoresist layer 505 is spin-coated on the glass master single-grating, and a mask 506 is partially covered on the S1818 photoresist layer 505 (step (e) in FIG. 14). The mask 506 and the S1818 photoresist layer 505 on the glass master single-grating both are sequentially soft-baked on a hot plate at 90° C. for 3 minutes, exposed and developed, and hard-baked on the hot plate at 120° C. for 30 minutes to obtain a glass master dual-grating having two single grating structures (step (f) in FIG. 14). The PDMS reprints the dual single-sided grating structure from the glass master dual-grating (step (g) in FIG. 14) to produce a PDMS master dual-grating 507 having two single grating structures (step (h) in FIG. 14). Next, a sol-gel material is spin-coated on a stainless steel substrate 509 to form a sol-gel layer 508, and then the PDMS master dual-grating 507 is imprinted on the sol-gel layer 508 using the nanoimprint lithography method (step (i) in FIG. 14). The imprinted sol-gel layer 508 uses a sequential process of 30 minutes of soft baking at 70° C. in an oven, 20 minutes of UV light exposure and 12 hours of hard baking at 110° C. in an oven to produce the dual-grating mold 510 having dual single-sided grating structures (step (j) in FIG. 14).

In step 630, a plastic material is formed on the dual-grating mold 510 having dual single-sided grating structures by a forming process (step (k) in FIG. 14) to obtain the substrate 110 having two single grating structures (step (l) in FIG. 14). The plastic material can be a transparent plastic. The transparent plastic can be cyclo-olefin copolymers (COCs), polycarbonate, acrylic, polypropylene, or other suitable plastic materials. The forming process can be injection molding, compression molding, thermoforming, extrusion molding, vacuum molding, or other plastic shaping process.

In step 640, the waveguide layer is formed on the substrate 110 by a deposition method. The material of the waveguide layer can be titanium dioxide, silicon dioxide, titanium(III) oxide, tantalum pentoxide, zinc oxide or other suitable materials. The deposition method can be sputtering, evaporation deposition, dip coating, spin coating or other deposition methods. In detail, the deposition process is firstly proceeded under 6 standard cubic centimeter per minute (sccm) of the oxygen flow and 9 sccm of argon at a rotating speed of 8 rpm of a rotation holder, and then the chamber pressure (working pressure) is set as $2 \times 10^{-3}$ torr by adjustment the main valve, and the power supply of an sputtering gun is operated at a power of 100 W. Subsequently, the parameters above may be slightly tuned to perform the deposition. Therefore, the waveguide layer 120 including the first double-sided grating structure 151, the rectangular light channel 125 and the second double-sided grating structure 152 will be formed on the surface of the substrate 110 with a uniform thickness to obtain a dual grating chip having two double-sided grating structures (step (m) in FIG. 14).

In step 650, the upper cover 130 which the entrance 142 and the exit 143 are configured thereon is adhered to the waveguide later using a UV glue, and winged infusion sets (not shown in step (n) of FIG. 14) are individually connected to the entrance 142 and the exit 143 and sealed with a two-component adhesive. Therefore, a space is formed between the inner surface 141 of the upper cover 130 and the upper surface of the waveguide layer 120 to become the channel 140 for accommodating the analyte, and the dual grating sensor 100 of the present invention is obtained (step (n) in FIG. 14).

It's worth noting that the increased number of the injection mold for the S1818 grating mold (which is manufactured by the S1818 photoresist layer) causes the S1818 photoresist layer to peel off, therefore the usage time of the S1818 grating mold has become shorter. However, in consideration of the cost reduction and the simplification of procedure steps rather than the issue of the S1818 photoresist layer, the glass substrate 504 in steps (c)-(f) in FIG. 14 can be replaced by the stainless steel substrate 509, steps (g)-(i) in FIG. 14 can be omitted, and the S1818 grating mold obtained in step (f) can be directly used in the forming process of step (k). In other words, to obtain the excellent products, in the manufacturing process of the dual grating sensor of the present invention, the nanoimprint lithography method can be also used twice in steps (a)-(c) and (g)-(i) to produce a mold without the S1818 photoresist layer so as to increase usage time of the mold.

The detection capability and the sensitivity of the dual grating sensor of the present invention are increased because of the double coupling effect, which is different from the single coupling effect (only contain couple-in effect or couple-out effect) in the prior art. The detection capability of the dual grating sensor can be enhanced by the additive effect caused by the double coupling effect. In addition, it is known from the refractive index experiments that the average sensitivity of the dual grating sensor of the present invention is $-46.42 \pm 2.23$ $RUI^{-1}$, which is twice that of the single grating sensor or more. Therefore, it can be proved that the double coupling effect of these two gratings have an additive effect on the sensitivity of the dual grating sensor.

Furthermore, in comparison with the prior art, the mold used in the present invention is manufactured using the nanoimprint lithography method twice so that the mold can be rigid and durable to increase the usage times and reduce the cost of mass production. Therefore, in addition to the simplification of the processing steps, defect rate and production time of the dual grating sensor are also reduced in the manufacturing process of the present invention. In addition, the sol-gel material can improve the usage time of the dual grating sensor and increase the number of injection product (where about 1000 pieces of the injection products can be made per sol-gel grating mold), and an injection molding machine can produce a large number of highly repeatable dual grating sensors. Accordingly, using injection molding to produce the dual grating sensors can reduce the production cost and uniform the quality of each dual grating sensor.

Embodiments

1. A dual grating sensing system for detecting at least one property of an analyte, including: a substrate; a waveguide layer formed on the substrate, wherein the waveguide layer has a first double-sided grating structure and a second double-sided grating structure; an upper cover covered on the first double-sided grating structure and the second double-sided grating structure to form a channel between the waveguide layer and the upper cover, wherein the analyte flows in the channel; and a light source emitting a light, wherein the light couples into the waveguide layer via the first double-sided grating structure, and couples out of the waveguide layer via the second double-sided grating structure to detect the at least one property of the analyte, wherein the first and the second double-sided grating structures have a first sensitivity and a second sensitivity respectively, and a total sensitivity of the dual grating sensing system has an additive effect by the light passing through the first double-sided grating structure and the second double-sided grating structure.

2. The dual grating sensing system according to Embodiment 1, wherein the waveguide layer further includes a rectangular light channel configured between the first double-sided grating structure and the second double-sided grating structure.

3. The dual grating sensing system according to Embodiment 1 or 2, wherein the first double-sided grating structure has a first grating and a second grating, the rectangular light channel has a first surface and a second surface, and the second double-sided grating structure has a third grating and a fourth grating.

4. The dual grating sensing system according to any one of Embodiments 1 to 3, wherein the first double-sided grating structure, the rectangular light channel and the second double-sided grating structure form a dual double-sided grating structure.

5. The dual grating sensing system according to any one of Embodiments 1 to 4, wherein the second grating, the second surface and the fourth grating are formed on the substrate, and the first grating, the first surface and the third grating form the channel with the upper cover.

6. The dual grating sensing system according to any one of Embodiments 1 to 5, wherein the light couples into the waveguide layer via the second grating, transmits via the rectangular light channel, and couples out of the waveguide layer via the fourth grating to detect the at least one property of the analyte.

7. The dual grating sensing system according to any one of Embodiments 1 to 6, further including: a light detector detecting a light intensity of an emergent light which passes through the first double-sided grating structure, the rectangular light channel and the second double-sided grating structure; and a data processor connected to the light detector, wherein the data processor processes the emergent light intensity to obtain the at least one property of the analyte.

8. The dual grating sensing system according to any one of Embodiments 1 to 7, wherein the substrate includes a material being a transparent plastic.

9. The dual grating sensing system according to any one of Embodiments 1 to 8, wherein the transparent plastic includes cyclo-olefin copolymer, polycarbonate, acrylic, or polypropylene.

10. The dual grating sensing system according to any one of Embodiments 1 to 9, wherein the waveguide layer includes a material being selected from titanium dioxide, silicon dioxide, titanium(III) oxide, tantalum pentoxide, or zinc oxide.

11. The dual grating sensing system according to any one of Embodiments 1 to 10, wherein the upper cover includes an entrance configured at a first end position corresponding to the first double-sided grating structure to guide the analyte into the channel, and an exit configured at a second end position corresponding to the second double-sided grating structure to guide the analyte out of the channel.

12. The dual grating sensing system according to any one of Embodiments 1 to 11, wherein the lengths of the first double-sided grating structure and the second double-sided grating structure are the same, and the length is 5 mm.

13. The dual grating sensing system according to any one of Embodiments 1 to 12, wherein the first double-sided grating structure further includes a first end and a second end, and the coupling position of the light coupling into the waveguide layer is ranged between 0.5 mm to 5 mm from the first end of the first double-sided grating structure.

14. The dual grating sensing system according to any one of Embodiments 1 to 13, wherein the coupling angle of the light coupling into the waveguide layer is ranged between 11.09° to 12.39°.

15. The dual grating sensing system according to any one of Embodiments 1 to 14, wherein a sensitivity of the dual grating sensing system does not change with the variations of the coupling angle and the coupling position.

16. The dual grating sensing system according to any one of Embodiments 1 to 15, wherein the analyte includes one of a labeled analyte and a label-free analyte.

17. A dual grating sensor for detecting at least one property of an analyte, including: a substrate having a first concavo-convex surface and a second concavo-convex surface; a waveguide layer formed on the substrate, wherein the waveguide layer includes an upper surface, a first concavo-convex part corresponding to the first concavo-convex surface and a second concavo-convex part corresponding to the second concavo-convex surface, and each of the first concavo-convex part and the second concavo-convex part forms a double-sided grating structure; and an upper cover having an inner surface and covered on the waveguide layer, wherein a channel is formed by the inner surface and the upper surface to accommodate the analyte, wherein a light couples into and out of the waveguide layer via the two double-sided grating structures to detect the at least one property of the analyte, and the first and the second concavo-convex parts have their own sensitivity.

18. The dual grating sensor according to Embodiment 17, wherein the waveguide layer further includes a rectangular light channel configured between the first concavo-convex part and the second concavo-convex part.

19. The dual grating sensor according to Embodiment 17 or 18, wherein the upper cover includes an entrance configured at a first end position corresponding to the first concavo-convex part to guide the analyte into the channel, and an exit configured at a second end position corresponding to the second concavo-convex part to guide the analyte out of the channel.

20. The dual grating sensor according to any one of Embodiments 17 to 19, wherein the analyte includes one of a labeled analyte and a label-free analyte.

21. A method for manufacturing the dual grating sensor according to Embodiment 17, including: producing a mold having a dual grating pattern; forming a transparent plastic in the mold to obtain the substrate; forming the waveguide layer on the substrate to obtain the dual double-sided grating structure; and adhering the upper cover to the dual double-sided grating structure to form the channel between the waveguide layer and the upper cover to pass therethrough the analyte, and to obtain the dual grating sensor.

22. The method according to Embodiment 21, wherein the waveguide layer is formed on the substrate by a deposition method.

23. The method according to Embodiment 21, or 22, wherein the deposition method is sputtering, evaporation deposition, dip coating or spin coating.

24. The method according to any one of Embodiments 21 to 23, wherein the substrate is formed by a forming process being injection molding, compression molding, thermoforming, extrusion molding or vacuum molding.

25. The method according to any one of Embodiments 21 to 24, wherein the transparent plastic includes cyclo-olefin copolymer, polycarbonate, acrylic, or polypropylene.

26. The method according to any one of Embodiments 21 to 25, wherein the waveguide layer has a material being titanium dioxide, silicon dioxide, titanium(III) oxide, tantalum pentoxide, or zinc oxide.

27. A method for detecting at least one property of an analyte, including: providing the dual grating sensor and a light source; guiding the analyte into the dual grating sensor, wherein the analyte directly contact any one side of the dual double-sided grating structure; emitting a light; and detecting the at least one property of the analyte by coupling the light into and out of the waveguide layer via the dual double-sided grating structures.

28. The method according to Embodiment 27, wherein the light couples into the waveguide layer from the first concavo-convex part with a coupling position and a coupling angle, and couples out of the waveguide layer from the second concavo-convex part.

29. The method according to Embodiment 27 or 28, further including: providing a light detector; receiving an emergent light passing through the first concavo-convex part and the second concavo-convex part; and detecting a light intensity of the emergent light.

30. The method according to any one of Embodiments 27 to 29, further including: providing a data processor; and processing the light intensity to obtain the at least one property of the analyte.

31. The method according to any one of Embodiments 27 to 30, wherein the coupling position includes an input coupling position and an output coupling position, and the coupling angle includes an input coupling angle and an output coupling angle.

32. The method according to any one of Embodiments 27 to 31, wherein the coupling position and the coupling angle do not vary with the change of a refractive index of the analyte.

33. A method for detecting at least one property of an analyte, including: providing a substrate, a waveguide layer and an upper cover; making the substrate having a first concavo-convex surface and a second concavo-convex surface; making the waveguide layer having an upper surface, a first concavo-convex part corresponding to the first concavo-convex surface and a second concavo-convex part corresponding to the second concavo-convex surface, and each of the first concavo-convex part and the second concavo-convex part forms a double-sided grating structure; and making the upper cover having an inner surface, which forms a channel with the upper surface of the waveguide layer to accommodate the analyte, wherein a light couples into and out of the waveguide layer via the two double-sided grating structures to detect the at least one property of the analyte.

34. The method according to Embodiment 33, wherein the light couples into the waveguide layer from the first concave-convex part with a coupling position and a coupling angle, and couples out of the waveguide layer from the second concavo-convex part.

35. The method according to Embodiments 33 or 34, wherein the first concavo-convex part further includes a first end and a second end, wherein the coupling position is ranged between 0.5 mm to 5 mm from the first end of the first double-sided grating structure, and the coupling angle is ranged between 11.09° to 12.39°.

In summary, the present invention provides a novel dual grating sensor to enhance the detection capability and the sensitivity thereof by the double coupling effect of the emergent light. In contrast to the single coupling effect in the prior art, the additive effect is achieved by the double coupling effect to enhance the detection capability of the dual grating sensor of the present invention. Furthermore, the mold used in the present invention is manufactured using the nanoimprint lithography method twice so that the mold can be rigid and durable to increase the usage times and reduce the cost upon mass production.

Although the present invention has been described with reference to certain exemplary embodiments thereof, it can be understood by those skilled in the art that a variety of modifications and variations may be made to the present invention without departing from the spirit or scope of the present invention defined in the appended claims, and their equivalents.

What is claimed is:

1. A dual grating sensing system for detecting at least one property of an analyte, comprising:
    a substrate;
    a waveguide layer formed on the substrate, wherein the waveguide layer has a first double-sided grating structure and a second double-sided grating structure;
    an upper cover covered on the first double-sided grating structure and the second double-sided grating structure to form a channel between the waveguide layer and the upper cover, wherein the analyte flows in the channel; and
    a light source emitting a light, wherein the light couples into the waveguide layer via the first double-sided grating structure, and couples out of the waveguide layer via the second double-sided grating structure to detect the at least one property of the analyte,
    wherein the first and the second double-sided grating structures have a first sensitivity and a second sensitivity respectively, and a total sensitivity of the dual grating sensing system has an additive effect by the light passing through the first double-sided grating structure and the second double-sided grating structure.

2. The dual grating sensing system as claimed in claim 1, wherein the waveguide layer further comprises a rectangular light channel configured between the first double-sided grating structure and the second double-sided grating structure.

3. The dual grating sensing system as claimed in claim 2, wherein the first double-sided grating structure has a first grating and a second grating, the rectangular light channel has a first surface and a second surface, and the second double-sided grating structure has a third grating and a fourth grating.

4. The dual grating sensing system as claimed in claim 3, wherein the first double-sided grating structure, the rectangular light channel and the second double-sided grating structure form a dual double-sided grating structure.

5. The dual grating sensing system as claimed in claim 3, wherein the second grating, the second surface and the fourth grating are formed on the substrate, and the first grating, the first surface and the third grating form the channel with the upper cover.

6. The dual grating sensing system as claimed in claim 2, wherein the light couples into the waveguide layer via the first double-sided grating structure, transmits via the rectangular light channel, and couples out of the waveguide layer via the second double-sided grating structure to detect the at least one property of the analyte.

7. The dual grating sensing system as claimed in claim 2, further comprising:
    a light detector detecting a light intensity of an emergent light of the light passing through the first double-sided grating structure, the rectangular light channel and the second double-sided grating structure; and
    a data processor connected to the light detector, wherein the data processor processes the light intensity to obtain the at least one property of the analyte.

8. The dual grating sensing system as claimed in claim 1, wherein the substrate includes a material being a transparent plastic which includes cyclo-olefin copolymer, polycarbonate, acrylic, or polypropylene.

9. The dual grating sensing system as claimed in claim 1, wherein the waveguide layer includes a material being selected from titanium dioxide, silicon dioxide, titanium(III) oxide, tantalum pentoxide, or zinc oxide.

10. A dual grating sensor for detecting at least one property of an analyte, comprising:
   a substrate having a first concavo-convex surface and a second concavo-convex surface;
   a waveguide layer formed on the substrate, wherein the waveguide layer comprises an upper surface, a first concavo-convex part corresponding to the first concavo-convex surface and a second concavo-convex part corresponding to the second concavo-convex surface, and each of the first concavo-convex part and the second concavo-convex part forms a double-sided grating structure; and
   an upper cover having an inner surface and covered on the waveguide layer, wherein a channel is formed by the inner surface and the upper surface to accommodate the analyte,
   wherein a light couples into and out of the waveguide layer via the dual double-sided grating structures to detect the at least one property of the analyte; and
   the first and the second concavo-convex parts have their own sensitivity.

11. The dual grating sensor as claimed in claim 10, wherein the waveguide layer further comprises a rectangular light channel configured between the first concavo-convex part and the second concavo-convex part.

12. A method for detecting at least one property of an analyte, comprising:
   providing the dual grating sensor as claimed in claim 10 and a light source;
   guiding the analyte into the dual grating sensor, wherein the analyte directly contact any one side of the dual double-sided grating structure;
   emitting a light; and
   detecting the at least one property of the analyte by coupling the light into and out of the waveguide layer via the dual double-sided grating structures.

13. The method as claimed in claim 12, wherein the light couples into the waveguide layer from the first concavo-convex part with a coupling position and a coupling angle, and couples out of the waveguide layer from the second concavo-convex part.

14. The method as claimed in claim 13, wherein the coupling position includes an input coupling position and an output coupling position, and the coupling angle includes an input coupling angle and an output coupling angle.

15. The method as claimed in claim 13, wherein the coupling position and the coupling angle do not vary with the change of a refractive index of the analyte.

16. The method as claimed in claim 12, further comprising:
   providing a light detector;
   receiving an emergent light passing through the first concavo-convex part and the second concavo-convex part; and
   detecting a light intensity of the emergent light.

17. The method as claimed in claim 16, further comprising:
   providing a data processor; and
   processing the light intensity to obtain the at least one property of the analyte.

* * * * *